Jan. 13, 1931.    C. O. CASTER ET AL    1,788,983
ELECTROMAGNETIC BRANDING MACHINE
Filed May 11, 1928    2 Sheets-Sheet 2
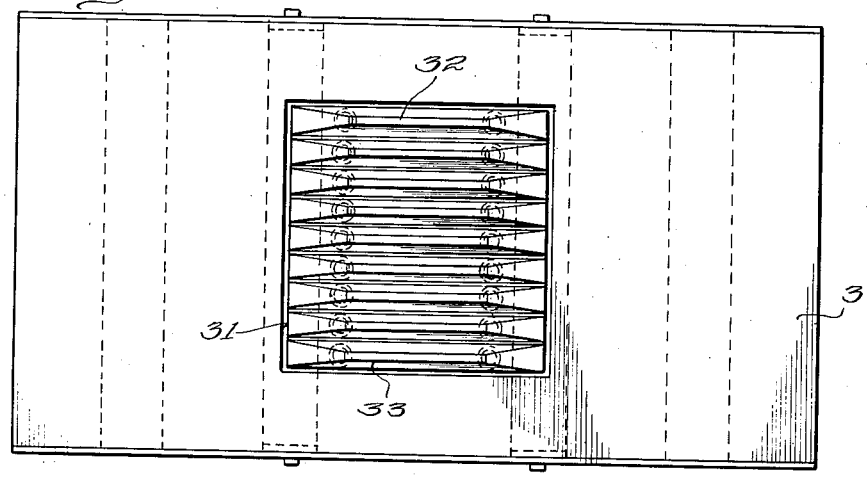
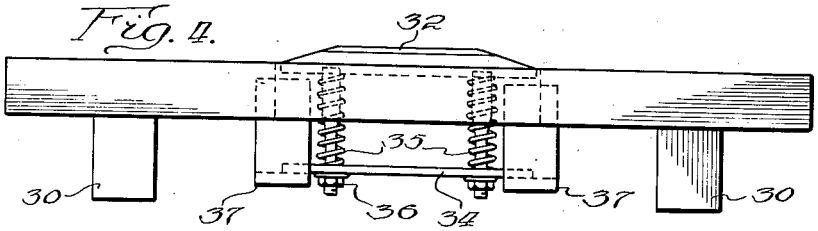
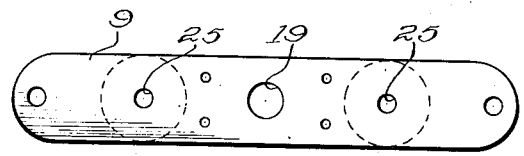
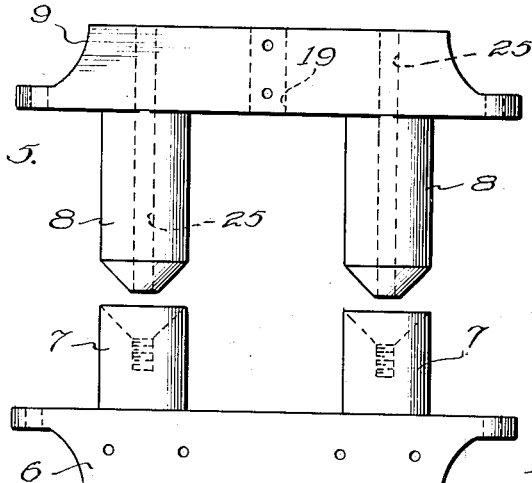
Inventors.
Clarence O. Caster
August H. Spitzenberger
By
Rummler & Rummler Attys.

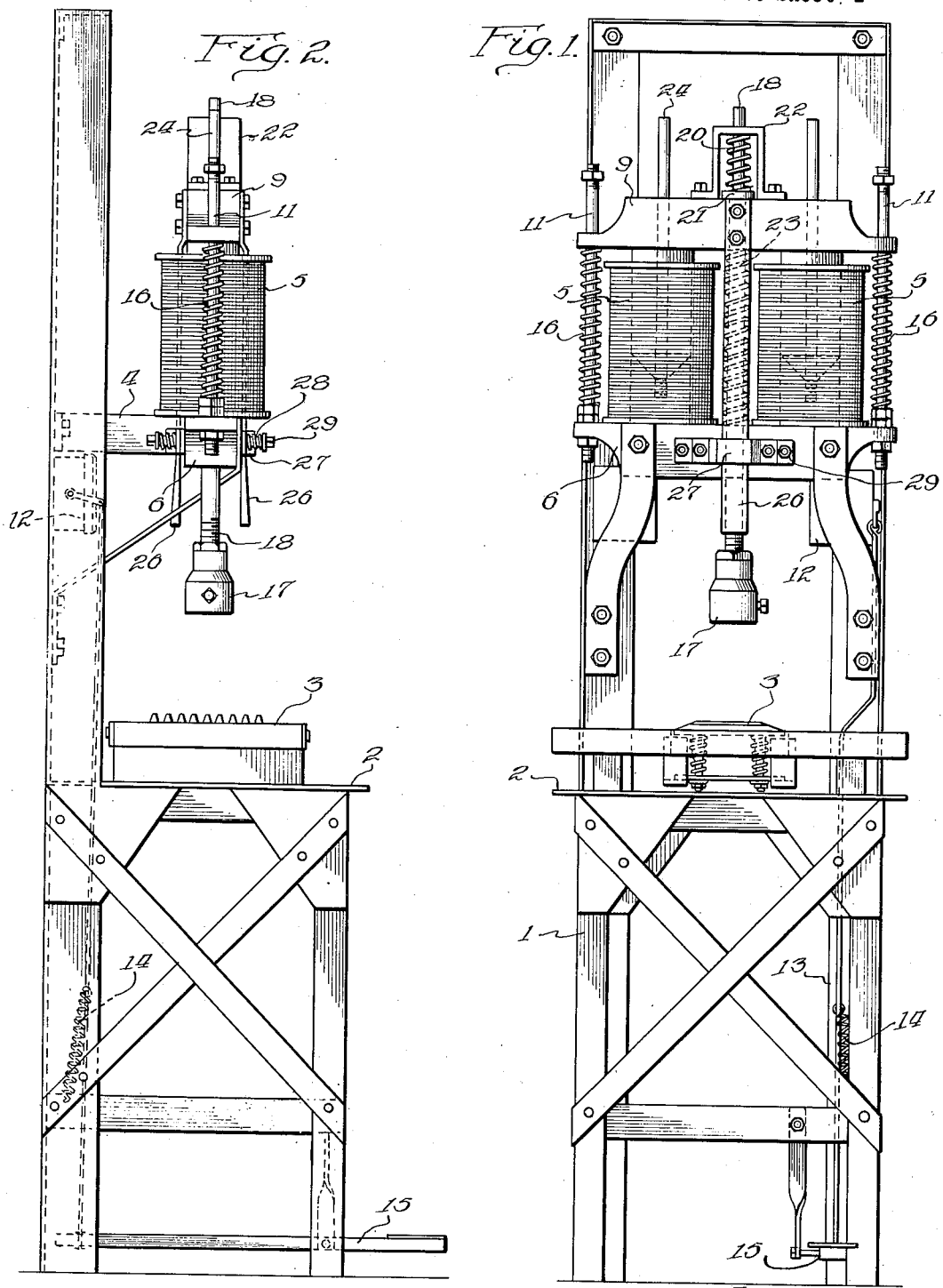

Patented Jan. 13, 1931

1,788,983

UNITED STATES PATENT OFFICE

CLARENCE ORLANDO CASTER AND AUGUST HECTOR SPITZENBERGER, OF OMAHA, NEBRASKA, ASSIGNORS TO SWIFT & COMPANY, OF CHICAGO, ILLINOIS, A CORPORATION OF ILLINOIS

ELECTROMAGNETIC BRANDING MACHINE

Application filed May 11, 1928. Serial No. 277,028.

This machine relates to the convenient and rapidly operated mechanism for branding articles for the market, and the objects of the invention are to provide means for properly cushioning the branding mechanism on the operating stroke, braking and cushioning the mechanism on the return stroke; to provide a spindle for the branding tool which is movable with respect to its operating mechanism to automatically adjust itself according to the height of the articles operated upon and to provide improvements in the platform or branding board of the machine whereby this board will automatically conform to the shape of an article resting upon the board and give according to the pressure applied by the branding device.

The objects of the invention are accomplished by a construction as shown in the drawings in which:

Figure 1 is a front elevation of the improved machine.

Fig. 2 is a side elevation thereof.
Fig. 3 is a plan view of the branding board.

Fig. 4 shows the board in elevation.

Fig. 5 shows details of the magnetic core of the solenoid.
In its general features of construction, the machine shown comprises a table top upon which rests a branding board composed of a plurality of resiliently depressible bars so arranged as to adapt themselves to the conformation of an article placed upon the board. Above the board is a vertical reciprocating spindle having a chuck for carrying the branding tool or other marking device. This spindle is operated by a movable core element slidable within a pair of solenoid coils and against the action of cushioning springs. A cushion or brake device is provided for checking the return motion of the solenoid core. The branding tool spindle operated by the core has its stroke modified according to the height of the article operated upon, by being mounted for relative motion with respect to the operating magnet core against spring action. The circuit of the solenoid coils is under the control of a switch operated by a foot treadle.

Referring to the drawings, the frame 1 of the machine supports a table 2 upon which rests a branding board 3. At its upper end, the frame is provided with a bracket 4 for supporting solenoid coils 5. The fixed base 6 for coils 5 is secured to the bracket 4 and includes the core elements 7 extending part way into the bottom of the coils. The movable core elements 8 of the electro-magnet are yoked together by the member 9 forming an armature which is slidable on posts 11 extending upwardly from the fixed supporting member 6. The circuit for the coils 5 is controlled by a switch in box 12 and operated by a bar 13. Bar 13 is depressible against the action of a spring 14 by foot treadle 15. When the circuit is closed, the core elements 8 move toward the core elements 7, against the action of springs 16 surrounding the posts 11, to the position indicated in Fig. 1.

The chuck 17 for the branding tool is carried by a vertically movable spindle 18, the upper end of which passes through an aperture 19 in the member 9 of the magnet core. A spring 20 coiled around the upper end of spindle 18 is compressed between a collar 21 fastened to the spindle and a yoke 22 secured to the core member 9. The spindle accordingly moves with the core member, but the branding tool normally engages the article operated upon before the magnet core has completed its full stroke and therefore relative motion is permitted between the spindle 18 and the core member 9 as provided for by the compression of spring 20. Springs 16, together with a spring 23 serve to cushion the magnet core on the downstroke thereof. Spring 23 surrounds the spindle 18 and bears between the fixed magnet support 6 and the movable part 9 of the core. The movable core element composing the members 8 and 9 is guided centrally with respect to the coils 5 by posts 24 screwed into the fixed core element 7 and extending through the vertical apertures 25 in the movable part of the core.

In order to cushion and brake the movable core, under the action of springs 16 and 23, upon its return stroke, the part 9 thereof has secured thereto a pair of depending brake elements 26 which are tapered at their lower ends, as shown in Fig. 2, to offer increasing resistance at the end of the return stroke of the movable core by cooperating with spring pressed plates 27. The plates 27 are resiliently urged towards the members 26 by springs 28 surrounding the plate guide posts 29 which are screwed into the fixed supports 6 for the coils.

The branding board 3 rests upon table 2, being spaced therefrom by the supporting members 30 at the bottom of the board. Centrally, the board has a rectangular aperture 31 for receiving a nest of depressible bars 32 upon which are placed the articles to be branded. Each bar 32 is provided with a pair of downwardly extending guide posts 33 passing through apertures in a plate 34. Coil springs 35 surround the posts 33 and are compressed between the plate 34 and the bars 32 by the adjustment of nuts 36 at the bottom of the posts. Plate 34 rests upon a pair of depending yokes 37. The springs 35 are light enough so that the bars 32 individually adjust themselves to conform to the shape of an article placed thereon and therefore serve to prevent an irregularly formed article from rocking upon the board under the pressure of the branding tool and also serve to provide a resilient support for such articles.

In the operation of the device, as articles are placed upon the branding board 3, foot treadle 15 is depressed, thus causing the coils 5 to become energized and draw the movable core element downwardly as guided by the posts 11 and 24. Through the yoke 22 and spring 20, the branding tool spindle 18 is pushed downwardly until the tool carried by chuck 17 engages the article on board 3. Further movement of the movable core element to the end of its stroke results in the compression of the spring 20 or depression of the resiliently supported bars 32 of the branding board. When the switch opens upon the release of treadle 15, the springs 16 and 23 restore the movable core element which returns the branding tool spindle by engagement with the collar 21 thereof. At the end of its upward motion, the movable core element is brought to a stop by the brake elements 26 frictionally engaging the spring pressed plates 27.

Although but one specific embodiment of this invention has been herein shown and described, it will be understood that details of the construction shown may be altered or omitted without departing from the spirit of this invention as defined by the following claims.

I claim:

1. In a branding machine, a frame structure including a support for articles operated upon, a tool holder mounted for reciprocation above said support, electro-magnetically operated means for imparting a uniform stroke to said tool holder, and a resilient connection between said means and tool holder for cushioning the action of the latter and arranged to permit a limited relative movement therebetween.

2. In a branding machine, a supporting frame, a tool holder mounted for vertical reciprocation in said frame, electro-magnetic means for reciprocating said tool holder, a branding board below said tool holder, said branding board comprising a plurality of parallel independently tiltable and depressible bars, and means for resiliently supporting each of said bars for allowing self adjusting of an article thereon by the action of said tool holder.

3. In a branding machine, a frame structure including a support for articles operated upon, a tool holder mounted for reciprocation above said support, electro-magnetic operating means for said tool holder, said means including an armature connected with said tool holder, springs for restoring said armature and tool holder after an operation thereof, braking means for modifying the action of said springs, said braking means comprising tapered elements carried by said armature and relatively stationary means for frictionally engaging said tapered elements.

4. In a branding machine, a frame structure including a support for articles operated upon, a tool holder mounted for reciprocation above said support, electro-magnetic operating means for said tool holder, said means including an armature, a resilient connection between said armature and said tool holder, springs for restoring said armature and tool holder after an operation thereof, braking means for modifying the action of said springs, said braking means comprising tapered elements carried by said armature and relatively stationary means for frictionally engaging said tapered elements.

5. A branding machine comprising a supporting frame, a branding tool holder mounted for reciprocation in said frame, driving means for reciprocating said branding tool holder, a stationary support comprising a plurality of bars yieldably mounted for relative movement, a yieldable connection between said tool holder and driving means, said support and driving connection being cooperative in subjecting articles of different thicknesses to substantially the same branding pressure.

Signed at Omaha, Nebraska, this 30th day of April, 1928.

CLARENCE ORLANDO CASTER.
        AUGUST HECTOR SPITZENBERGER.